(12) United States Patent
Nakanishi et al.

(10) Patent No.: US 10,994,381 B2
(45) Date of Patent: May 4, 2021

(54) CONTROLLER, DATA GENERATION DEVICE, CONTROL METHOD, AND CONTROL PROGRAM

(71) Applicant: FANUC CORPORATION, Yamanashi (JP)

(72) Inventors: Giichi Nakanishi, Yamanashi (JP); Yorikazu Fukui, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 15 days.

(21) Appl. No.: 16/273,420

(22) Filed: Feb. 12, 2019

(65) Prior Publication Data

US 2019/0275621 A1    Sep. 12, 2019

(30) Foreign Application Priority Data

Mar. 8, 2018  (JP) .............................. JP2018-041959

(51) Int. Cl.
*G05B 19/402* (2006.01)
*B23Q 1/00* (2006.01)

(52) U.S. Cl.
CPC ......... *B23Q 1/0054* (2013.01); *G05B 19/402* (2013.01)

(58) Field of Classification Search
CPC ............................ B23Q 1/0054; G05B 19/402
See application file for complete search history.

(56) References Cited

U.S. PATENT DOCUMENTS

| 6,397,124 B1* | 5/2002 | Lan ...................... G05B 19/409 451/5 |
| 2003/0088329 A1* | 5/2003 | Rutkowski ......... G05B 19/4093 700/95 |
| 2012/0179284 A1* | 7/2012 | Nakamura ........... G05B 19/408 700/160 |

(Continued)

FOREIGN PATENT DOCUMENTS

| JP | 2013-175129 | 9/2013 |
| JP | 2016-51190 | 4/2016 |

(Continued)

OTHER PUBLICATIONS

Notification of Reasons for Refusal dated Mar. 10, 2020 in JP Patent Application No. 2018-041959.

(Continued)

*Primary Examiner* — Thomas C Lee
*Assistant Examiner* — Gary Collins
(74) *Attorney, Agent, or Firm* — Wenderoth, Lind & Ponack, L.L.P.

(57) ABSTRACT

To provide a controller, a data generation device, a control method, and a control program allowing a part of a machining program to be changed easily. A controller comprises: a storage unit that stores change designation data describing a command value in association with respective identifiers indicating at least one block among multiple blocks constituting a machining program for a machine tool; a change unit that reads the multiple blocks in the machining program sequentially, and changes the block indicated by the identifier based on the command value described in the change designation data; and an analysis unit that analyzes the block changed by the change unit, and generates execution data.

7 Claims, 4 Drawing Sheets

(56) References Cited

U.S. PATENT DOCUMENTS

2014/0046476 A1* 2/2014 Walker .................... B21F 3/04
                                                        700/165
2016/0062336 A1   3/2016 Hitomi et al.
2017/0371316 A1* 12/2017 Kimura ............. G05B 19/4097

FOREIGN PATENT DOCUMENTS

| JP | 2016-139349 | 8/2016 |
| JP | 2017-228210 | 12/2017 |
| TW | 1607825 B | 12/2017 |

OTHER PUBLICATIONS

Office Action dated Nov. 19, 2020 in CN Patent Application No. CN201910165088.5.
Office Action dated Mar. 19, 2021 in DE Patent Application No. DE102019018129.7.

* cited by examiner

US 10,994,381 B2

CONTROLLER, DATA GENERATION DEVICE, CONTROL METHOD, AND CONTROL PROGRAM

This application is based on and claims the benefit of priority from Japanese Patent Application. No. 2018-041959, filed on 8 Mar. 2018, the content of which is incorporated herein by reference.

BACKGROUND OF THE INVENTION

Field of the Invention

The present invention relates to a controller for controlling a machine tool by following a machining program, a data generation device, a control method, and a control program.

Related Art

Conventionally, an instruction for a procedure of machining by a machine tool has been given from a numerical controller. Such a controller operates the machine tool by analyzing and executing a machining program containing multiple blocks each of which is a combination of motion commands such as an axis movement and command values such as a feedrate. This machining program is generated by an operator of the machine tool. To reduce the workload of the operator, a device for editing the machining program efficiently has been suggested as described in Patent Document 1, for example.

Patent Document 1: Japanese Unexamined Patent Application, Publication No. 2017-228210

SUMMARY OF THE INVENTION

However, if there is a need, for example, to repeat trial machining while changing command values such as the feedrate for a particular block only, the machining program must be edited every single time. This has necessitated burdensome work as the particular block must be repeatedly searched for from the machining program and be edited.

The present invention is intended to provide a controller, a data generation device, a control method, and a control program allowing a part of a machining program to be changed easily.

(1) A controller according to the present invention (controller 1 described later, for example) comprises: a storage unit (storage unit 11 described later, for example) that stores change designation data describing a command value for relative motion between a tool and a workpiece in association with respective identifiers indicating at least one block among multiple blocks constituting a machining program for a machine tool; a change unit (change unit 13 described later, for example) that reads the multiple blocks in the machining program sequentially, and changes the block indicated by the identifier based on the command value described in the change designation data and associated with the identifier; and an analysis unit (analysis unit 14 described later, for example) that analyzes the block changed by the change unit and generates execution data.

(2) In the controller described in (1), the storage unit may store multiple change designation data pieces, and the controller may comprise a selection unit (selection unit 12 described later, for example) that accepts selection of one of the change designation data pieces.

(3) In the controller described in (1) or (2), the command value may be given a code indicating a value type. If the block contains a command value given the same code as that of the command value described in the change designation data, the change unit may replace the command value in the block by the command value described in the change designation data, and if the block does not contain a command value given the same code, the change unit may add the command value described in the change designation data to the block.

(4) In the controller described in any one of (1) to (3), the command value may include the feedrate of an axis, the coordinate of the axis, or the spindle speed as value types.

(5) A data generation device according to the present invention (data generation device 2 described later, for example) generates the change designation data to be provided to the controller described in any one of (1) to (4). The data generation device comprises: a drawing unit (drawing unit 21 described later, for example) that draws a move path for the tool based on the machining program; an identification unit (identification unit 22 described later, for example) that, in response to selection of a part of the move path, identifies a block in the machining program corresponding to the part; an input unit (input unit 23 described later, for example) that displays an input screen for changing a command value in the identified block or adding a command value to the identified block and accepts input of a command value; and a generation unit (generation unit 24 described later, for example) that generates the change designation data based on an identifier for the identified block and the input command value.

(6) A control method according to the present invention is executed by a computer (controller 1 described later, for example) that stores change designation data describing a command value for relative motion between a tool and a workpiece in association with respective identifiers indicating at least one block among multiple blocks constituting a machining program for a machine tool, the computer executing: a change step of reading the multiple blocks in the machining program sequentially and changing the block indicated by the identifier based on the command value described in the change designation data and associated with the identifier; and an analysis step of analyzing the block changed in the change step and generating execution data.

(7) A control program according to the present invention is intended for causing a computer (controller 1 described later, for example), which stores change designation data describing a command value for relative motion between a tool and a workpiece in association with respective identifiers indicating at least one block among multiple blocks constituting a machining program for a machine tool, to execute: a change step of reading the multiple blocks in the machining program sequentially and changing the block indicated by the identifier based on the command value described in the change designation data and associated with the identifier; and an analysis step of analyzing the block changed in the change step and generating execution data.

According to the present invention, a part of a machining program can be changed easily.

DETAILED DESCRIPTION OF THE INVENTION

An example of an embodiment of the present invention will be described hereafter. Each of the functions constituting the embodiment are arranged in a dispersed manner in a controller 1 for controlling a machine tool by analyzing and executing a machining program and in a data generation device 2 for making partial change to the machining program. The controller 1 and the data generation device 2 may be implemented as a single device.

Figure 1:
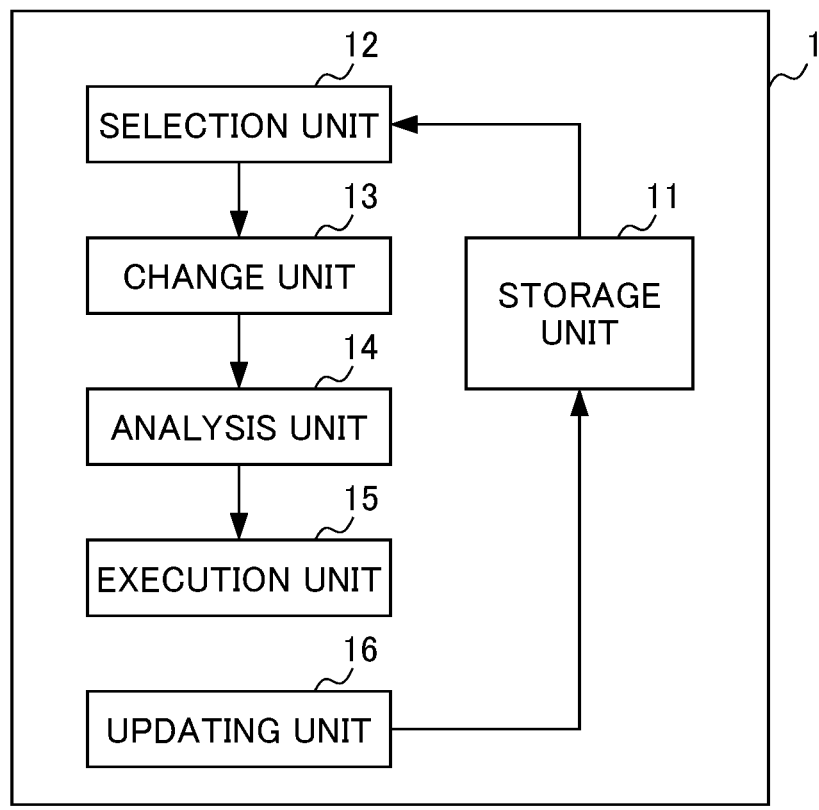
FIG. 1 shows the functional configuration of a controller according to an embodiment.

FIG. 1 shows the functional configuration of the controller 1 according to the embodiment. The controller 1 can be implemented as a numerical controller for a machine tool. However, this is not the only case. For example, the controller 1 can be configured using an information processor (computer) such as a personal computer or a tablet terminal having an interface with the numerical controller or a simulator. The controller 1 includes a storage unit 11, a selection unit 12, a change unit 13, an analysis unit 14, an execution unit 15, and an updating unit 16. The controller 1 further includes a display device for display of various types of data, an input/output interface for input and output of various types of data, etc.

The storage unit 11 stores one or more pieces of change designation data describing command values for relative motion between a tool and a workpiece in association with respective identifiers indicating at least one block among multiple blocks constituting a machining program for the machine tool.

Here, command values described in the blocks in the machining program as well as in the change designation data are given codes indicating a value type. For example, the command value includes the feedrate of an axis, the coordinate of a destination of the axis, the spindle speed, etc. as value types. The command value may also include an auxiliary function such as coolant or air blow.

The selection unit 12 displays the options of change designation data which are stored in the storage unit 11 and accepts selection of one change designation data piece.

Figure 2:
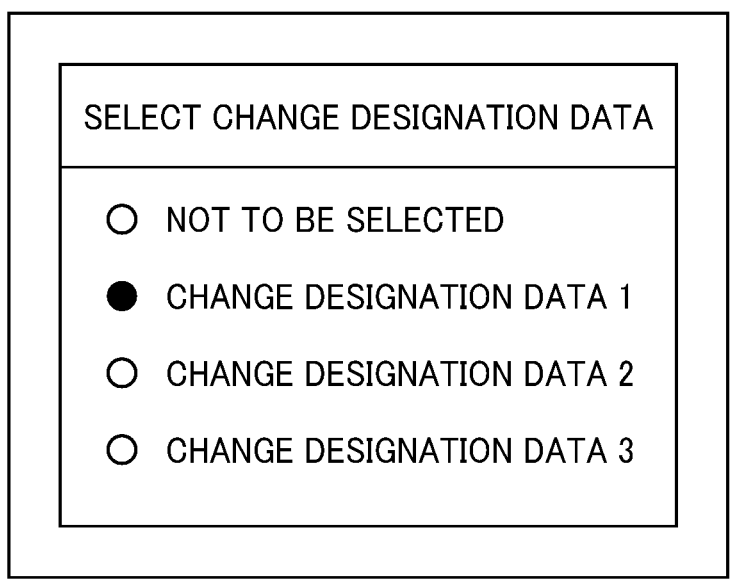
FIG. 2 shows an example of a selection screen for selecting change designation data according to the embodiment.

FIG. 2 shows an example of a selection screen for selecting change designation data according to the embodiment. In this example, stored data includes change designation data 1, change designation data 2, and change designation data 3. The options presented are to apply either of the change designation data pieces to the machining program, or to use the machining program without making changes thereto.

The change unit 13 reads the multiple blocks in the machining program sequentially, and changes a block indicated by an identifier described in change designation data based on a command value associated with this identifier. More specifically, the change unit 13 changes a command value described in the block, or adds a new command value to the block. For example, if a command value described in change designation data and a command value described in a block in the machining program have a common code indicating a type, the change unit 13 replaces the command value described in the block by the command value described in the change designation data. If a block in the machining program does not contain a command value given the same code as that of a command value described in change designation data, the change unit 13 adds the command value described in the change designation data to this block.

Figure 3:
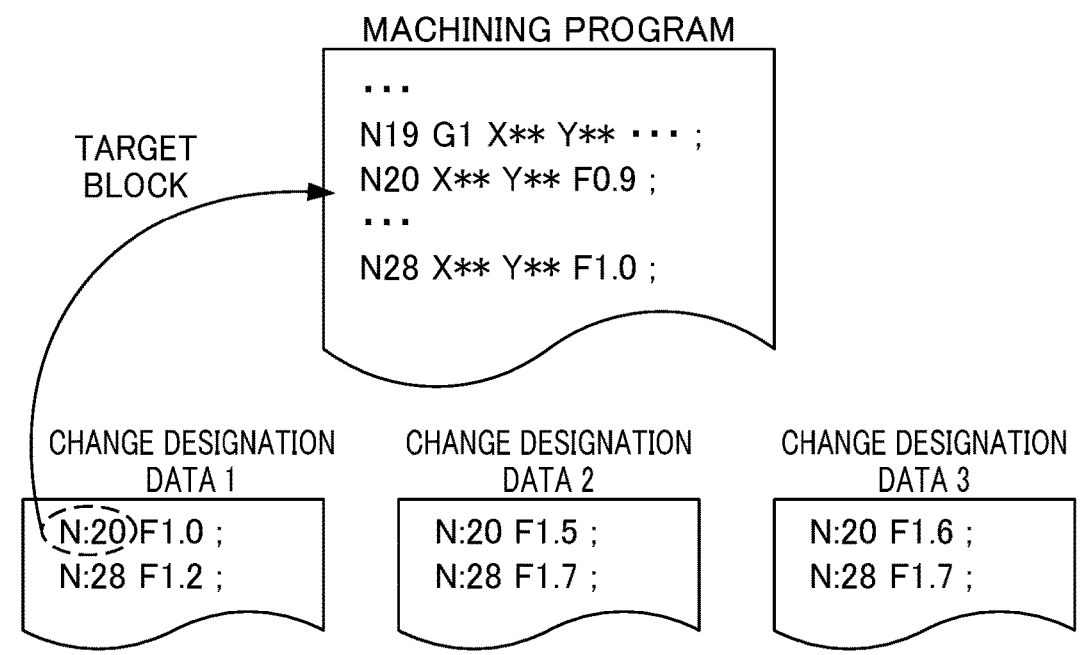
FIG. 3 shows a first example of change designation data according to the embodiment.

FIG. 3 shows a first example of change designation data according to the embodiment. In this example, a command value described in an original machining program is changed to a different value.

The machining program is given identifiers such as N19, N20, and N28 as identifiers for each of the multiple blocks. Each block contains command values "X," "Y," "F*.*," etc. described using codes X, Y, F, etc. indicating types. Here, X and Y indicate coordinates, and F indicates a feedrate.

The change designation data contains an identifier indicating a block in the machining program as well as a value to replace a command value in this block. If change designation data 1 is selected, for example, an original command value "F0.9" in a change target block indicated by "N20" is changed to "F1.0." Further, an original command value "F1.0" in a block indicated by "N28" is changed to "F1.2."

Figure 4:
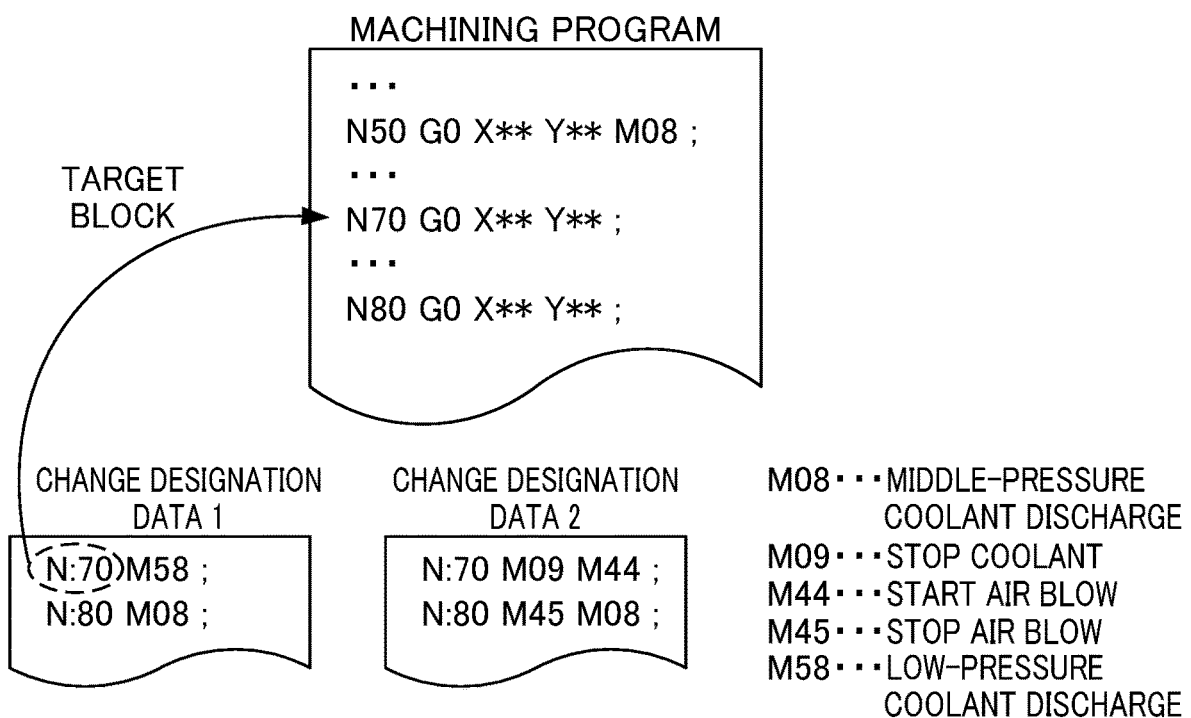
FIG. 4 shows a second example of change designation data according to the embodiment.

FIG. 4 shows a second example of change designation data according to the embodiment. In this example, a new command value is added to the original machining program.

As described in a block "N50" in the machining program, a command value "M08" for middle-pressure coolant discharge is generally used during machining. Change designation data 1 and 2 are used for changing the state of the coolant or that of air blow in the machining program temporarily according to the geometry, etc., in order to make a trial.

If the change designation data 1 is selected, for example, a command value "M58" for low-pressure coolant discharge is added to a target block "N70." Further, the command value "M08" for middle-pressure coolant discharge is added to a target block "N80." By so doing, middle-pressure coolant is changed to low-pressure coolant in the section from N70 to N80. If the change designation data 2 is selected, a command value "M09" for coolant stop and a command value "M44" for start of air blow are added to the target block "N70." Further, a command value "M45" for stop of air blow and the command value "M08" for middle-pressure coolant discharge are added to the target block "N80." By so doing, middle-pressure coolant is changed to air blow in the section from N70 to N80.

The analysis unit 14 analyzes the block changed by the change unit 13 and generates execution data. The execution unit 15 operates the machine tool based on the generated execution data. The analysis unit 14 can analyze the block in advance so as to avoid the occurrence of a time lag before the execution.

The updating unit 16 updates the original machining program itself using the selected change designation data in response to input of an instruction from an operator, and stores the updated machining program as a new machining program into the storage unit 11. At this time, the updating unit 16 may update other unselected change designation data based on a rule stored in advance so as to achieve conformity with the new machining program, that is, so that the result of the change is the same as before.

Figure 5:
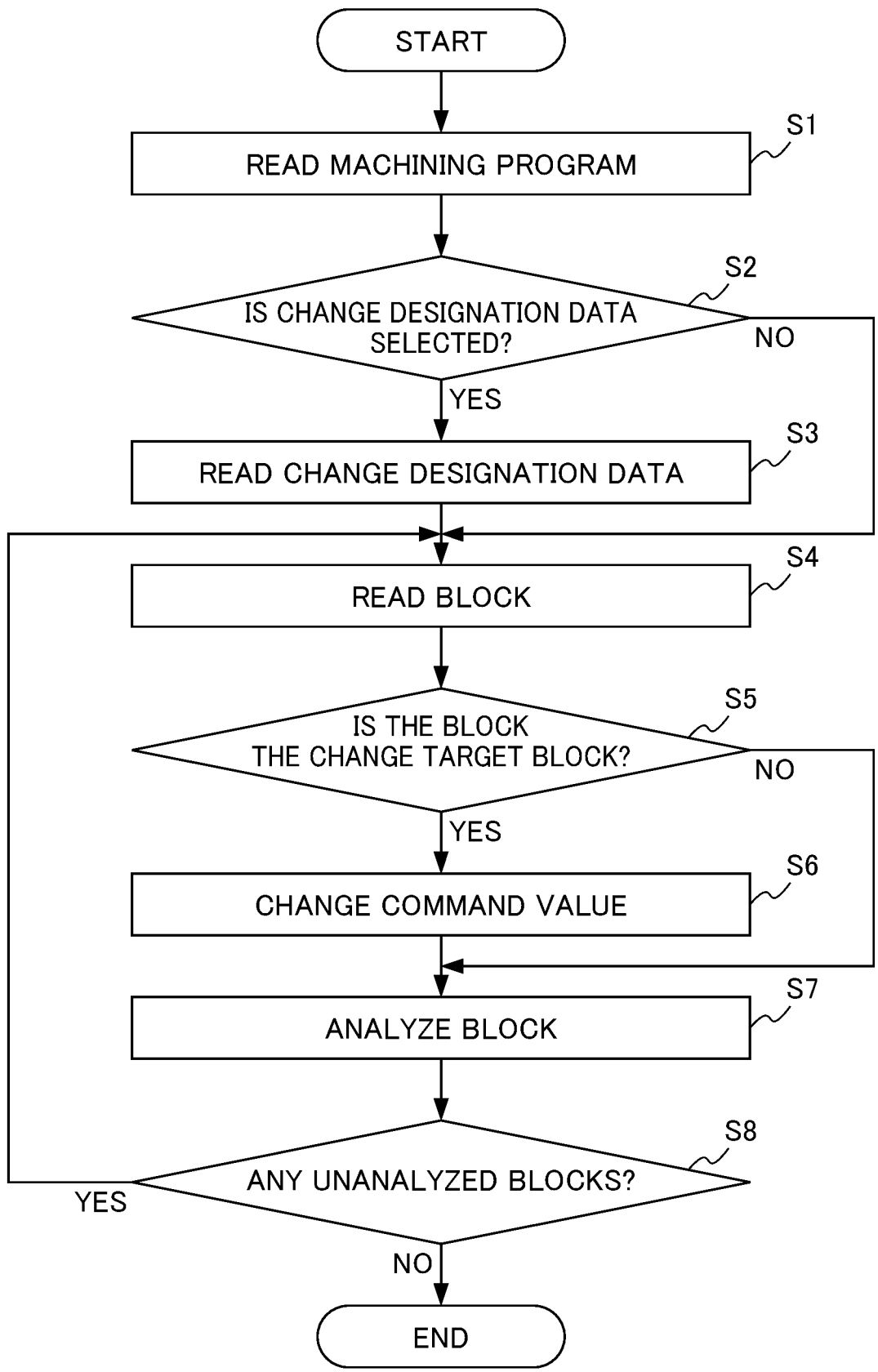
FIG. 5 is a flowchart showing processing performed by the controller according to the embodiment during execution of a machining program.

FIG. 5 is a flowchart showing processing performed by the controller 1 according to the embodiment during execution of a machining program. In step S1, the controller 1 accepts an instruction to execute the machining program, and reads this machining program into a memory. In step S2, the controller 1 determines whether or not change designation data for changing a command value in the machining program is selected by the selection unit 12. If the result of the determination is YES, the processing proceeds to step S3. If the result of the determination is NO, the processing proceeds to step S4. In step S3, the controller 1 reads the selected change designation data into the memory.

In step S4, the controller 1 (change unit 13) sequentially reads blocks constituting the machining program. In step S5, the controller 1 (change unit 13) determines whether or not each of the read blocks is a target of the change designation data. If the result of the determination is YES, the processing proceeds to step S6. If the result of the determination is NO, the processing proceeds to step S7.

In step S6, the controller 1 (change unit 13) changes a command value in the read block to a command value in the change designation data or adds the command value in the change designation data to the read block. In step S7, the controller 1 (analysis unit 14) analyzes the changed block, and generates execution data. In step S8, the controller 1 determines whether or not there is an unanalyzed block. If the result of the determination is YES, the processing proceeds to step S4. If the result of the determination is NO, the processing is finished.

Figure 6:
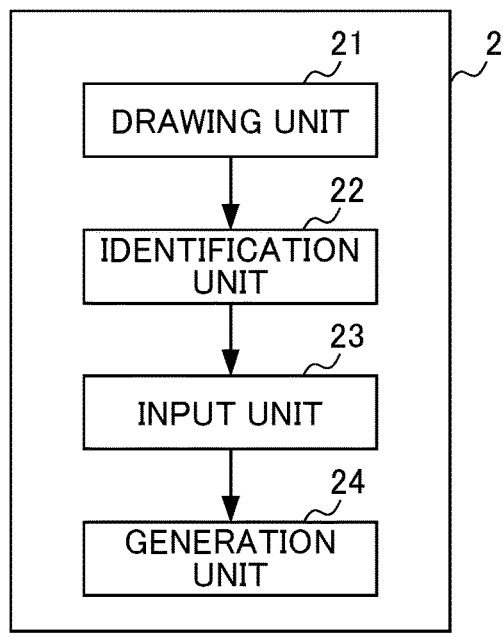
FIG. 6 shows the functional configuration of a data generation device according to the embodiment.

FIG. 6 shows the functional configuration of the data generation device 2 according to the embodiment. The data generation device 2 is an information processor (computer) including a control unit for controlling the device entirely, a storage unit, a display device for display of various types of data, an input/output interface for input and output of various types data, etc. In response to execution of software stored in the storage unit by the control unit, the data generation device 2 functions as the following units. The data generation device 2 includes a drawing unit 21, an identification unit 22, an input unit 23, and a generation unit 24. The data generation device 2 generates or edits change designation data to be provided to the controller 1.

The drawing unit 21 simulates the motion of a tool by analyzing a machining program, and draws a move path.

If a user selects a part of the move path, the identification unit 22 identifies a block in the machining program corresponding to the selected part.

The input unit 23 displays an input screen in which a command value in the identified block is to be changed or a command value is to be added to the identified block, and accepts input of a command value.

The generation unit 24 generates change designation data based on an identifier for the identified block and the input command value.

Figure 7:
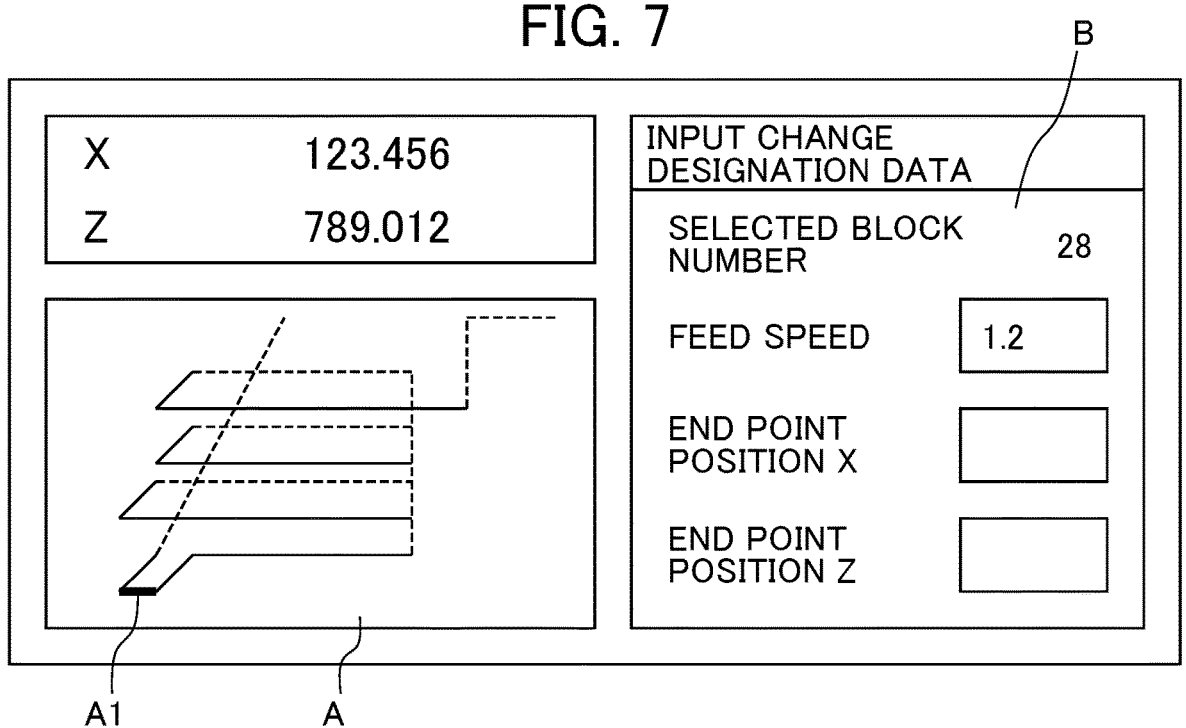
FIG. 7 shows an example of an edit screen for editing change designation data according to the embodiment.

FIG. 7 shows an example of an edit screen for editing change designation data according to the embodiment. A move path A for a tool is drawn as the result of a simulation conducted based on a machining program. If an instruction to partially change the machining program is accepted, the data generation device 2 makes a part of the move path A selectable, and accepts input for selection from a user.

For example, if a part A1 is selected from the move path A, a block in the machining program describing a command for the part A1 is identified. Further, an input field 13 for input of command values is displayed along with a selected block number as an identifier. This example shows a block which gives a command for axis movement in an XZ plane including coordinates (X: 123.456, Z: 789.012) as a start point position, wherein a feedrate and the coordinates of an end point position can be input as command values.

The data generation device 2 generates change designation data based on the selected block number and the input command values. If a further instruction for data generation is accepted thereafter, the data generation device 2 accepts command values for the same block on a similar input screen. In this way, the data generation device 2 generates multiple change designation data pieces.

If an instruction to edit change designation data is accepted, the data generation device 2 displays a selection screen similar to that shown in FIG. 2, and accepts input for selecting the change designation data to be edited. Then, an input field filled in with the content, of the selected change designation data, that is, the selected block number and command values, is displayed. After the command values in the input field are edited, the command values in the change designation data are updated to the input values, and the updated values are saved.

According to the embodiment, when executing a machining program, the controller 1 refers to change designation data corresponding to some of multiple blocks constituting the machining program as target blocks, and analyzes a block containing a changed command value. Thus, by referring to a file different from the machining program, the controller 1 becomes capable of changing a part of the machining program easily and executing the changed machining program without editing the original machining program. As a result, processing efficiency is increased in trial machining involving repeated change in command values.

Since the controller 1 accepts input for selecting change designation data from multiple change designation data pieces, an operator can efficiently try multiple change patterns which are prepared in advance.

A command value is given a code indicating types such as the feedrate of an axis, the coordinate of the axis, the spindle speed, or an auxiliary function, for example, and the controller 1 can determine a command value to be changed based on this code. This makes it possible to efficiently perform processing such as replacement of command values of the same type or addition of a command value of a different type.

The data generation device 2 simulates a machining program to draw a move path for a tool. The data generation device 2 accepts input for selecting a part of the move path to identify a block in the machining program. Further, the data generation device 2 accepts input of a command value to be described in the identified block to generate change designation data to be provided to the controller 1. In this way, the data generation device 2 facilitates identification of the block to be changed based on the move path for the tool, thereby optimizing generation of the change designation data.

An embodiment of the present invention has been described; however, the present invention should not be limited to the above-described embodiment. The effects described in the embodiment are merely a list of the most preferable effects resulting from the present invention, and effects achieved by the present invention should not be limited to those described in the embodiment.

A control method by the controller 1 and a data generation method by the data generation device 2 are realized by software. To realize these methods by software, programs constituting the software are installed on a computer. Alternatively, these programs may be stored in a removable medium and distributed to a user, or may be distributed by being downloaded to a computer of the user through a network.

EXPLANATION OF REFERENCE NUMERALS

1 Controller
2 Data generation device
11 Storage unit
12 Selection unit
13 Change unit
14 Analysis unit
15 Execution unit
16 Updating unit
21 Drawing unit
22 Identification unit
23 Input unit
24 Generation unit

What is claimed is:

1. A controller comprising:
a storage unit that stores change designation data describing a command value for relative motion between a machine tool and a workpiece in association with respective identifiers indicating at least one block among multiple blocks constituting a machining program for the machine tool, the change designation data being a file that is different from the machining program;
a change unit that reads the multiple blocks in the machining program sequentially, and, in the course of executing the machining program, refers to stored change designation data and changes the block of the machining program being executed that is indicated by the identifier based on the command value described in the change designation data and associated with the identifier; and
an analysis unit that analyzes the block changed by the change unit, and generates execution data.

2. The controller according to claim 1, wherein
the storage unit stores multiple change designation data pieces,
the controller comprising a selection unit that accepts selection of one of the change designation data pieces.

3. The controller according to claim 1, wherein
the command value is given a code indicating a value type, and
if the block contains a command value given the same code as that of the command value described in the change designation data, the change unit replaces the command value in the block by the command value described in the change designation data, and if the block does not contain a command value given the same code, the change unit adds the command value described in the change designation data to the block.

4. The controller according to claim 1, wherein
the command value includes a feedrate of an axis, a coordinate of the axis, or a spindle speed as a value type.

5. A data generation device that generates the change designation data to be provided to the controller according to claim 1, comprising:
a drawing unit that draws a move path for the tool based on the machining program;
an identification unit that, in response to selection of a part of the move path, identifies a block in the machining program corresponding to the part;
an input unit that displays an input screen for changing a command value in the identified block or adding a command value to the identified block, and accepts input of a command value; and
a generation unit that generates the change designation data based on an identifier for the identified block and the input command value.

6. A control method executed by a computer that stores change designation data describing a command value for relative motion between a machine tool and a workpiece in association with respective identifiers indicating at least one block among multiple blocks constituting a machining program for the machine tool, the change designation data being a file that is different from the machining program, the computer executing:
a change step of reading the multiple blocks in the machining program sequentially, and, in the course of executing the machining program, referring to stored change designation data and changing the block of the machining program being executed that is indicated by the identifier based on the command value described in the change designation data and associated with the identifier; and
an analysis step of analyzing the block changed in the change step and generating execution data.

7. A non-transitory computer-readable medium storing a control program for causing a computer, which stores change designation data describing a command value for relative motion between a machine tool and a workpiece in association with respective identifiers indicating at least one block among multiple blocks constituting a machining program for the machine tool, the change designation data being a file that is different from the machining program, to execute:
a change step of reading the multiple blocks in the machining program sequentially, and, in the course of executing the machining program, referring to stored change designation data and changing the block of the machining program being executed that is indicated by the identifier based on the command value described in the change designation data and associated with the identifier; and
an analysis step of analyzing the block changed in the change step, and generating execution data.

* * * * *